INVENTORS
William Henderson Paterson
Leslie and Joseph Johnston Hunter
BY
Lawson and Taylor 've## 3,230,772
ELECTRICAL MEASUREMENT OF A PHYSICAL QUANTITY William Henderson Paterson Leslie and Joseph Johnston Hunter, Glasgow, Scotland, assignors to National Research Development Corporation, London, England, a British corporation
Filed Jan. 23, 1961, Ser. No. 84,147
14 Claims. (Cl. 73—362)

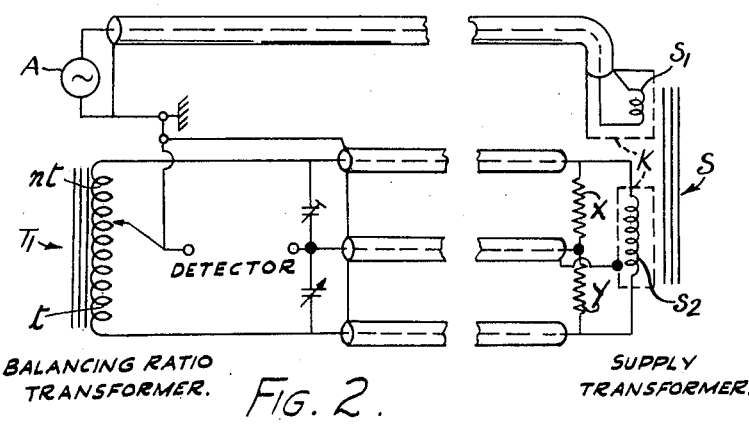
BALANCING RATIO TRANSFORMER.   FIG. 2.   SUPPLY TRANSFORMER.
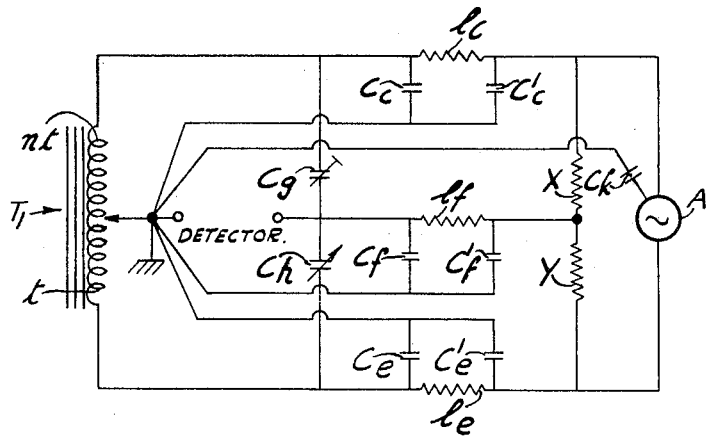
FIG. 3.

This invention relates to the electrical measurement of temperature and has for an object to improve the accuracy of response of the temperature-sensitive element, and of measurement of that response in terms of temperature. The temperature-sensitive element is a resistance having a known thermal coefficient of resistivity.

It is required of equipment according to the invention that it should enable measurement to be made of temperature differences of the order of 0.1° C. with an error less than 1%, or temperature error less than 1 percent, or temperature equality between two points with an error less than 0.001° C. Smaller errors would be very acceptable. In both cases the absolute temperature may be between 0° C. and 100° C. and mostly in the range 10° C. to 20° C.

One particular application of the present invention is the estimation of the hydraulic losses in pumps and turbines by the measurement of the temperature rise in the working fluid due to the conversion of losses to heat.

Existing resistance thermometers which have been designed for millidegree accuracy have been developed from Callendar's initial conception of using strain-free platinum wire mounted with the minimum of support, so that strains due to differential expansion of the thermometer elements are not transmitted to the platinum resistance element. It suffices to note that these thermometers have all been designed for careful handling under laboratory conditions. If they are subjected to vibration or knocks the resistance at a given temperature alters due to mechanical strains in the wire and the estimated temperature may be in error by several hundredths of a degree Celsius.

Platinum has been used for resistance thermometers because it is chemically fairly inert, easily workable, available in a high state of purity and can be used over a wide range of temperatures with a fairly simple empirical law for the relationship between resistance and temperature.

Copper is a material available commercially in a high degree of purity and is chemically resistant to many types of corrosion at room temperature. It is used in some industrial-type resistance thermometers designed to operate in the temperature range −140° C. to +120° C. because it is cheaper than platinum. Properly designed copper resistance thermometers can maintain their ice point calibration within 0.05° K., even when cycled between 20° K. and room temperature, and when the measuring copper resistance is simultaneously used as a heater.

This can be ensured by the combination of a rigid mounting for the resistance thermometer wire and complete freedom from differential expansion of the wire and its mounting.

In contradistinction to the foregoing known devices, one aspect of the present invention is an electrical resistance thermometer unit comprising a pair of resistances of materials having different thermal coefficients of resistivity on a common mounting, each having a known value of resistance or ratio of resistance to that of the other at a given temperature. Each resistance may be wound on a support of the same metal as the resistance wire itself.

Each resistance is preferably bifilar wound, and the temperature-responsive resistance may with advantage be of copper whilst the standard resistance is of a material having a low thermal coefficient of resistivity.

Conveniently, the resistances are sealed into a moisture-proof housing, which may be constituted by a low thermal conductivity sheath having an end closure cap of high conductivity material on which the thermometer elements are mounted with maximum electrical and thermal conductivity.

It is preferred to measure the output of a thermometer unit according to the present invention by means of a bridge circuit having transformer ratio arms and so arranged as to eliminate from the measuring circuit the resistance of the leads to the thermometer unit, or to reduce its effect to a negligible quantity.

It has long been the practice to use D.C. excitation for bridges, the detector being a sensitive galvanometer. However, there are disadvantages attached to the use of direct current for field work—the most important are:

(a) thermo-electric and electro-chemical stray E.M.F.'s and
(b) fragility and relatively slow response of sensitive galvanometers and their sensitivity to vibration in use.

The stray E.M.F.'s necessitate taking two balances for each reading, with the applied bridge voltage reversed for the second reading and assuming the true balance reading is the mean of the two obtained. Even with this technique it is necessary to shield all terminals from draughts and avoid moisture—and sometimes the entire bridge has to be immersed in a temperature regulated container.

The fragility of the most sensitive galvanometers causes more robust types to be selected for field tests with the result that sensitivity is sacrificed and the judgment of the true balance becomes difficult. It is necessary to exercise care in placing the galvanometer clear of magnetic disturbances from electrical generators and free from vibration from whatever source.

This disadvantage of delicate galvanometers is not an essential feature of D.C. bridges. Contact modulated amplifiers are available which convert the out-of-balance direct voltage into an alternating voltage suitable for an A.C. amplifier. A zero stability of $10^{-9}$ v. is achieved and this corresponds to a temperature change of 0.0025 millidegree C. for a 100-ohm thermometer with a current of 1 ma.

The use of A.C. excitation for a bridge eliminates the effect of the parasitic E.M.F.'s and allows simple amplifiers to be used. Except in very favourable installations or at very low frequencies it is still necessary with conventional bridges such as a Smith or Mueller bridge, to perform two balances, one for the wanted resistance balance and the second to reduce the quadrature signal due to capacitance and inductance.

Both A.C. and D.C. bridges have to avoid excessive series resistance of the long connecting leads to the thermometer, but this is a more severe restriction in the D.C. bridge owing to the relatively low shunt resistance across the measuring arms represented by the resistor ratio arms for a given bridge output impedance to the detector. As discussed further below A.C. bridges can employ transformer ratio-arms which have high shunt impedance for low output impedance to the detector.

Both types of bridge have to guard against shunt leakage impedance across the thermometer connections and leads. For a 100 ohm thermometer, a shunt resistance of 25 megohm ($25 \times 10^6$ ohm) results in an error of 0.001° C., so that moisture must be excluded from all resistors and terminals.

The introduction of modern high permeability magnetic materials has made the transformer ratio arm one of the most precise voltage sources available, and modern bridge techniques are tending to favour the A.C. bridge in place of the traditional D.C. circuits. The use of transformers provides a highly accurate and convenient method of transferring voltages or currents between bridge arms to compensate for, or avoid, the effects of stray impedance. Transformers can now be constructed in which the voltage ratio is independent of vibration and aging of the materials, and even different transformers of the same design can be relied on to exhibit identical voltage ratios.

The present invention includes a bridge circuit for measuring the value of a thermometer resistance, this circuit having transformer ratio arms so arranged as to eliminate from the measuring circuit the resistance of the leads to the thermometer, or at least to reduce its effect to a negligible quantity.

Preferably, the bridge circuit is energised at the measuring point, conveniently by means of a supply transformer located at the said point. In this way, the effects of the resistance and leakage reactance of the leads from the A.C. source to the supply transformer can be minimised.

Advantageously, the said bridge circuits are combined with a temperature or like measuring unit having temperature-responsive and standard resistance elements mounted in a common housing and connected in the measuring arms of the bridge circuit.

A bridge circuit according to the present invention also preferably has a transformer connected in series in one or each ratio arm so as to compensate for the voltage drop in a lead to the thermometer or like measuring unit.

A further substantial advantage of transformer ratio arms is that due to the use of modern transformer materials, transformers can be built with very high ratios of shunt impedance to leakage impedance.

Practical embodiments of the invention will now be particularly described, by way of example only with reference to the accompanying drawing in which:

FIGURE 2 is a circuit diagram of a bridge including the thermometer unit of FIGURE 1 or FIGURE 1A;

FIGURE 3 is an equivalent circuit diagram of the bridge of FIGURE 2, showing the stray capacitance of the leads to the thermometer unit;

Figure 1:
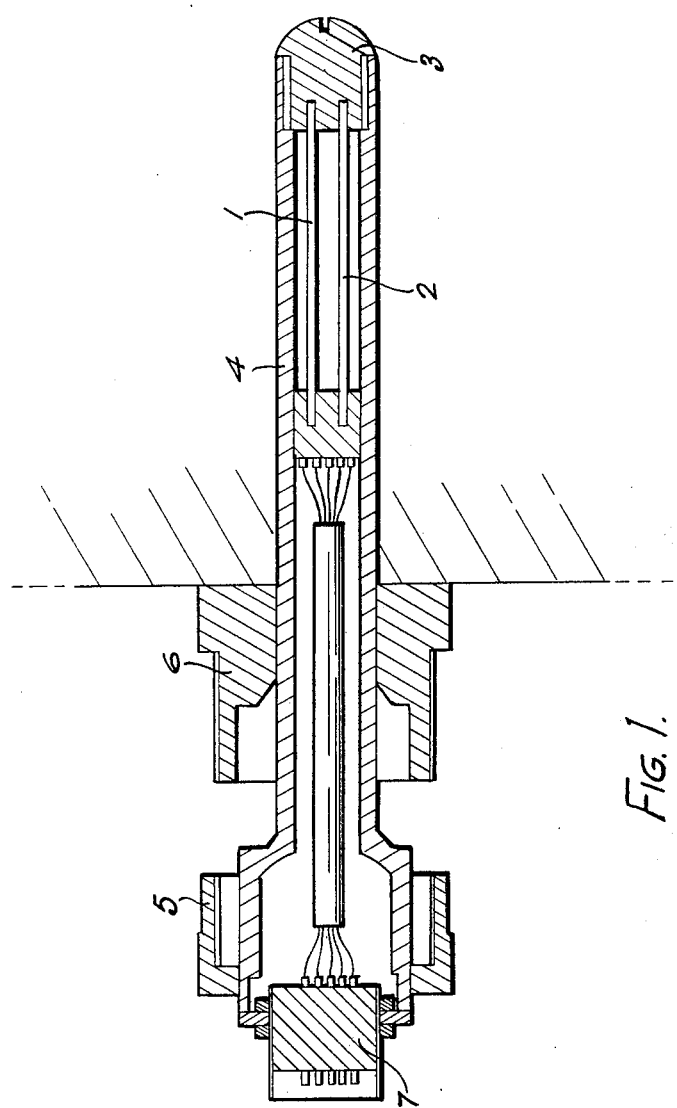
FIGURE 1 is a sectional elevation of a two-element resistance thermometer unit.

Referring first to FIG. 1 of the drawing, the twin-element thermometer unit shown consists of a copper temperature-responsive resistance element 1 and a standard resistance element 2 of an alloy material having a low thermal coefficient of resistivity. The elements 1, 2 are shown purely schematically in the drawing, but both are made to the same general pattern. The copper element 1 consists of a central core of vinyl acetate insulated copper rod of about 11 S.W.G. having 800 turns of 48 S.W.G. copper wire wound non-inductively thereon. The copper wire is also vinyl acetate insulated, and is coated with a synthetic resin adhesive. The alloy element 2 is similarly constructed, the element 2 comprising an alloy wire of low thermal coefficient of resistivity wound non-inductively on a support of the same alloy as the wire. Both elements 1 and 2 are mounted on a heavy copper sealing screw 3 which is screwed into a low conductivity corrosion resistant sheath 4. The resistance elements are mounted on the screw 3 by driving their core rods into sockets in the screw so as to ensure maximum heat transfer. The outer end of the sheath 4 is welded into one half 5 of a suitable coupling such as a water tight and pressure-tight coupling 5, 6. A terminal block 7 is sealed into this end of the sheath.

The elements 1, 2 are carefully wound so that the ratio of their resistance values is accurately known at a standard temperature. It is advantageous to make this ratio 1:1 at, say 20° C. The elements are then connected in the measuring arms of a bridge circuit, and any change in the change in the ratio of their resistance is a function of the temperature to which they are exposed, and the bridge can be calibrated directly in terms of temperature.

Figure 1A:
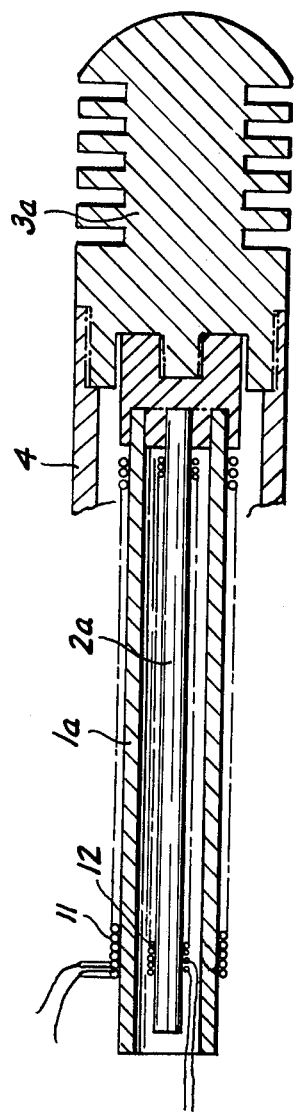
FIGURE 1A is a fragmentary sectional view of a modification of FIGURE 1.

FIGURE 1A illustrates a modification in which the mandrel for the copper temperature-responsive resistance element 11 is a copper tube 1a. Coaxially within this tube is located a standard resistance element 12 wound on a rod 2a of the same material—preferably an alloy having a very low thermal coefficient of resistivity. One end of the tube 1a and the corresponding end of the rod 2a are tightly secured to a common externally finned copper block 3a, the other ends of these components being secured in a common terminal block, and the whole assembly being sheathed, in the same manner as shown in FIGURE 1.

There is a practical difficulty in making the resistance of the copper measuring thermometer 1 greater than 100Ω, and the lead resistance between it and the bridge can be as much as 1Ω. The shunt impedance of a typical long lead may be of the order of 100,000Ω reactance at 1 kc./s. By using a bridge in which the ratio arms are constituted by a transformer and have an impedance which is large compared with the resistance of the leads, the voltage drop in the leads will be negligible, and the ratio of the thermometer measuring arms will be the same as the turns ratio of the transformer.

The effects of the resistance and reactance of the leads from the A.C. source to the transformer can be minimized by using a supply transformer at the measuring point. This is illustrated schematically in FIG. 2, where S is the supply transformer having a primary $S_1$, secondary $S_2$ and screen K; A is the A.C. source; and X and Y represent the two elements 1, 2 of FIG. 1. The equivalent circuit shown in FIG. 3 shows that the stray capacitances $C_c$, $C'_c$ and $C_a$, $C'_e$ of the leads $l_e$, $l_c$ can be considered as shunted across the ratio arms $nt$ and $t$, respectively, of the ratio transformer $T_1$, and are thus of negligible effect on the ratio. The capacitance $C_k$ between the supply transformer secondary and its screen is equivalent in effect to $C'_c$ or $C'_e$. The detector lead contributes leakage reactance $C_f$, $C'_f$ and resistance $l_f$; since $l_f$ is again negligible compared with the reactance of $C_f$ the two capacitances are effectively shunting the detector and thus decreasing the sensitivity but not affecting balance. The capacitors $C_g$ and $C_h$ are necessary to balance any slight asymmetry in the stray reactances associated with the two thermometer windings, and to correct for any slight phase shift in the ratio transformer.

The simplicity of the bridge of FIG. 2 is due to the use of the twin element thermometer of FIG. 1 which avoids some of the normal cable problems. When it is necessary to compare two temperatures, it is preferable to duplicate the whole installation so that both can be observed simultaneously, but it is possible to supply both from one oscillator and to switch the ratio transformer and detector from one installation to the other.

In practice the ratio transformer has to be tapped in steps of 1 part in 100,000. As 100,000 taps would be impractical, a known arrangement can be adopted in which the transformer has only one decade of steps (divided into 10 equal windings) and these steps are used five times. They are used first direct, and then are coupled in series via one, two, three and four 10:1 transformers (the primary of each is fed from the decade taps via selector switches and from the secondary of the next less significant transformer). This preserves the low output impedance of the tap while giving the necessary fine division of ratio.

Figure 4:
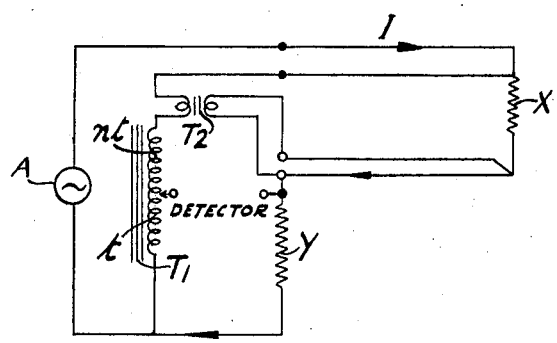
FIGURES 4 and 5 show two variants of a compensated bridge circuit for minimising the effects of voltage drops in long leads to the thermometer unit.

The principle of the circuit of FIG. 2 is capable of extension, especially if space precludes the mounting of the temperature responsive element X and the standard resistance Y in the same casing. In FIG. 4, the temperature element X is electrically remote from the potential balance part of the bridge; that is, there is a sufficiently long lead, or sufficiently resistive lead, coupling the remote element X to the potential balance part of the bridge to cause a lead voltage drop of relative significance to the voltage drop across the remote element. FIG. 4 uses an additional transformer, $T_2$, to introduce a voltage into the "$nt$" arm equal to the voltage drop in the lead coupling the remote element X to the standard resistance Y. The path of the energizing current is marked by arrows I. There is therefore a neutralizing effect on the potential balance part of the bridge of the voltage drop due to the energizing current flowing in the electrically long lead to the remote element. The principle is that the voltage drop due to I is admitted into the potential balance part of the bridge and converted by transformer $T_2$ into an in-phase voltage of equal magnitude and fed into the ratio arms $nt$ and $t$.

Figure 5:
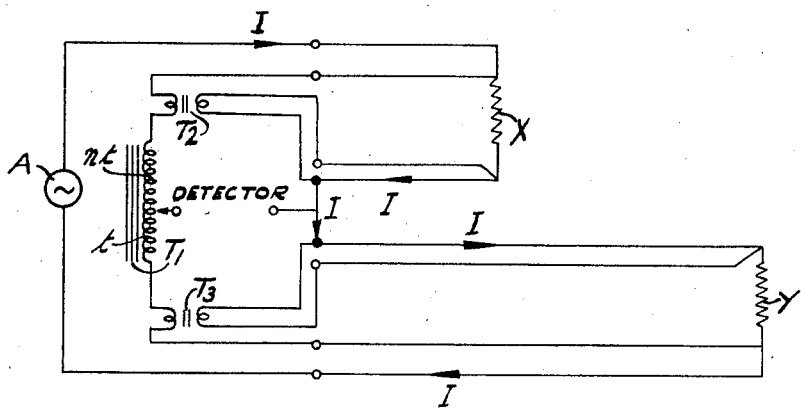

The bridge of FIG. 5 shows the extension of this compensation principle to two remote elements. In this case, transformers $T_2$ and $T_3$ introduce voltages equal to the voltage drop from the two essential current leads (coupling the remote thermometer X and standard resistance Y at different places, if necessary) into the "$nt$" and "$t$" arms. In both cases $X=nY$.

It is necessary in all the transformer ratio-arm bridges for two conditions to be observed, and these conditions are easily visualized in FIG. 4:

(1) The ratio-arm shunt impedance must be high so that the current required to excite it produces a negligible voltage drop in the transformer $T_2$ and the connecting leads.

(2) The detector must have a voltage sensitivity sufficient to indicate unbalance to the required accuracy. It must also be of a sufficiently high impedance so that the necessary current to indicate unbalance causes a negligible voltage drop in $T_2$ and the connecting leads.

Figure 6:
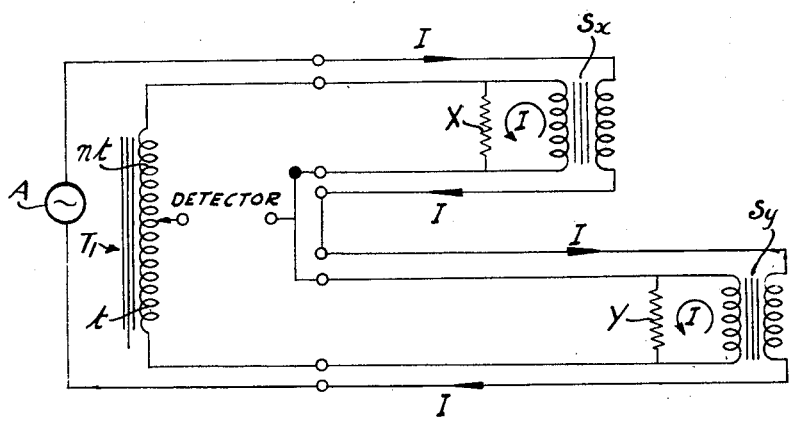
FIGURES 6 and 7 are circuit diagrams of bridge arrangements for removing the voltage drops in the thermometer leads from the measuring circuit.

FIGURE 6 illustrates another way of compensating for voltage drop in the leads and thereby neutralizing the effect of the voltage drop on the potential balance part of the bridge. In this arrangement the thermometer and standard resistances X and Y are fed separately through isolating current transformers $S_x$ and $S_y$, whose primaries are in series across the supply oscillator A. No current-carrying wire enters the potential (or bridge) part of the circuit and thus the lead resistance is unimportant so long as it is very much less than the impedance of $nt$, $t$ and the reactance of any stray capacitances.

Figure 7:
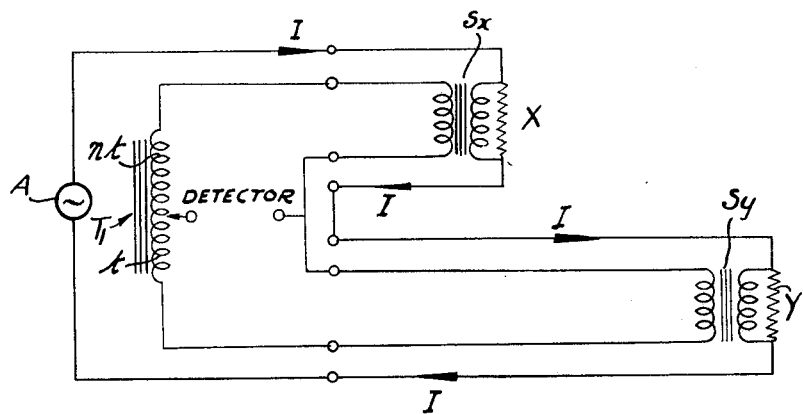

FIGURE 7 shows a similar arrangement, but this time the current is fed round both the thermometer and standard resistances in series, and two potential transformers $S_x$ and $S_y$ allow the potentials across the resistances X, Y to be coupled to the bridge circuit without introducing any voltages due to lead voltage drop.

Figure 8:
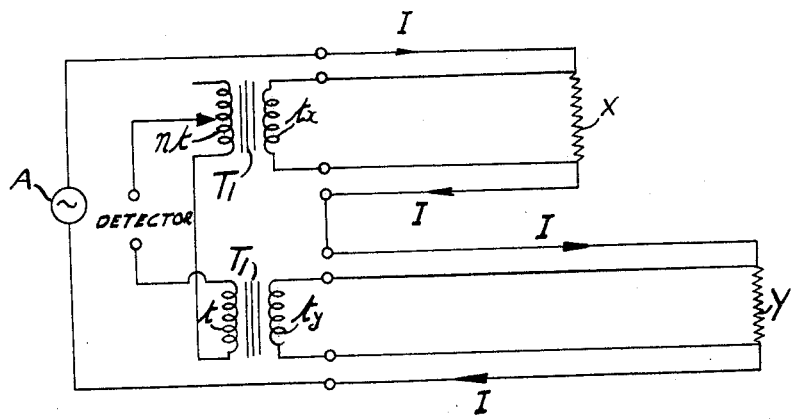
FIGURE 8 is a modification of FIGURE 7.

In FIG. 8 is shown a similar arrangement to that shown in FIG. 7 but now the transformers $S_x$, $S_y$ of FIG. 7 have been combined with the ratio arm transformer $T_1$, which is shown as two separate transformers having primaries $T_x$, $T_y$, respectively, connected across the thermometer and standard resistances X, Y while the secondaries $nt$, $t$ form the ratio arms as before.

Transformers $S_x$ and $S_y$ of FIGS. 6 and 7 are current transformers coupling in the supply voltage. None of the energizing current I, therefore, flows in the bridge circuit. The resistance values X and Y cannot in practice be of the same magnitude of impedance as $nt$ and $t$, and therefore a large current is required to flow through them in order to produce comparable potentials. By arranging for this large current to flow in the external primary circuit, the potentials generated in the leads carrying the large currents do not affect the potential balance part of the bridge.

It should be noted that the shunt impedances of the coupling transformers in FIGS. 6, 7 and 8 are directly across the elements X and Y. They must therefore be very large relative to X and Y. The coupling transformers in FIGURES 4 and 5 must have shunt impedances high relative to the lead resistances across which they are connected.

Each of the five bridges shown in FIGS. 4–8 would require additional quadrature balancing capacitors in a practical case and the effect of stray capacitance would have to be carefully assessed, but they all offer advantages which cannot be obtained with D.C. bridges.

A practical difficulty in certain hydraulic investigations is the existence of temperature gradients across a tail race. This normally requires thermometer traverses of the tail race to be made which are both time consuming and a source of error, since the results can only be used on the assumption that conditions remain perfectly steady during the traverse (some 30 to 60 min.).

Figure 9:
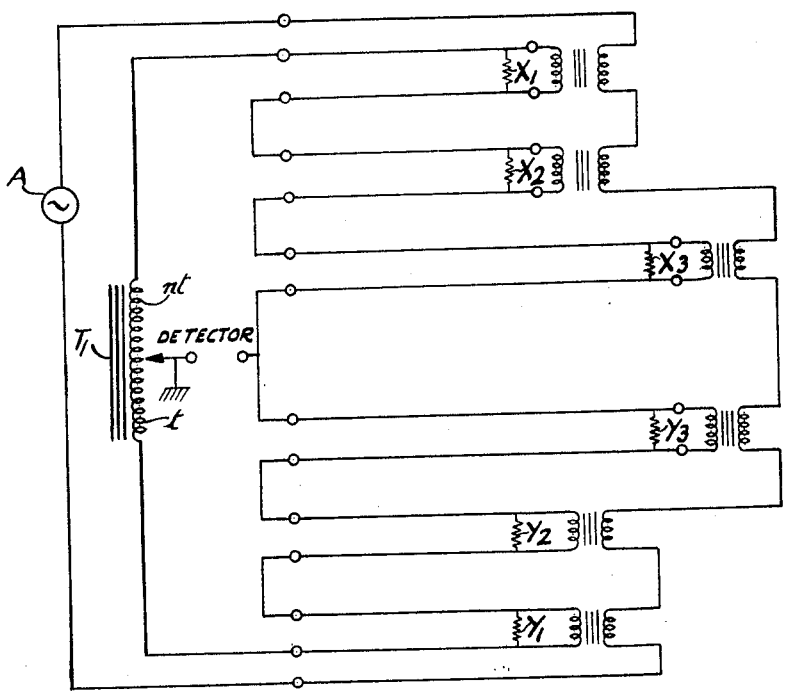
FIGURE 9 is a modification of FIGURE 7 to accommodate three thermometer units.

The present invention provides for the tail race temperature to be obtained by the insertion of a number of thermometers, positioned as the result of a preliminary traverse or by drawing on experience. With the bridges FIGS. 7–9 any number of thermometers can be connected in series in each arm. This could not be done on a D.C. bridge without introducing lead voltage drops. FIG. 9 illustrates how the bridge of FIG. 6 would be connected for three thermometers with copper resistances $X_1$, $X_2$ and $X_3$ and alloy standard resistances $Y_1$, $Y_2$ and $Y_3$. The ratio required for balance would represent the mean temperature of the three points provided that $X_1$, $X_2$ and $X_3$ are equal. It is not necessary to calibrate the thermometers individually—they could be calibrated as a group. The bridges of FIGS. 7, 8 and 9 can deal with any practical number of thermometers in this way.

Although the foregoing description has been limited to the measurement of temperature, it is to be understood that the same bridge circuits and the same general mechanical structure of the sensing unit which is responsive to an external condition can be applied to the measurement of other physical quantities—e.g. strain, humidity, or pressure—all of which can be detected by a change in resistance of a probe or sensing element. Unless repugnant to the context, therefore, the foregoing references to temperature measurement are to be construed as equally applicable to the measurement of other physical quantities by means of a change in resistance.

We claim:

1. An electrical measuring instrument for measuring a physical quantity comprising a bridge circuit, said bridge circuit having its ratio arms in the potential balance part of the bridge comprising the secondaries of a transformer, and said bridge circuit having at least two measuring arms, one of said measuring arms comprising at least one non-inductively wound resistance element responsive to said physical quantity to be measured, another of said measuring arms comprising at least one non-inductively wound resistance element non-responsive to said physical quantity, and said bridge circuit having at least one of the non-inductively wound resistance elements of at least one of said measuring arms located at a point electrically remote from the potential balance part, said remote element being sufficiently remote for the impedance of a lead carrying the energising current of the bridge and connecting the remote element to the potential balance part to cause a significant voltage drop compared with that voltage drop appearing across said remote element, an A.C. voltage source coupled to at least the said remote element through a lead which is independent of the leads feeding the potential drop across the remote element to the potential balance part of the bridge, and means for neutralizing the effect on the potential balance part of the bridge of the voltage drop due to the energising current flowing in the electrically long lead to the remote element.

2. A measuring instrument according to claim 1 wherein said means for neutralizing comprises a transformer, the primary of said transformer being connected across said electrically long lead, and the secondary of said transformer being connected in series with one of said ratio arms, whereby a voltage substantially equal to the voltage drop in said electrically long lead is introduced into said one of said ratio arms to compensate for the resistance of said electrically long lead.

3. An electrical measuring instrument for measuring a physical quantity comprising a bridge circuit having a potential balance part, said bridge circuit comprising two ratio arms each comprising a secondary winding of a first transformer, said bridge circuit further comprising first and second measuring arms each comprising at least one second transformer, at least one non-inductively wound resistance element responsive to said physical quantity and connected in parallel with one of the windings of said second transformer of said first measuring arm, at least one non-inductively wound resistance element non-responsive to said physical quantity connected in parallel with one of the windings of said second transformer of said second measuring arm, at least one of said resistive elements of at least one of said measuring arms being located at a point electrically remote from the potential balance part of said bridge circuit, and an A.C. voltage source connected to the primaries of said second transformer for energizing said bridge circuit, said second transformer neutralizing the effect on the potential balance part of the bridge of the voltage drop due to energizing current flowing in a lead coupling said remote element to the potential balance part of said bridge.

4. An electrical measuring instrument according to claim 3 wherein said resistance element responsive to said physical quantity is connected in parallel with a secondary winding of said second transformer, and wherein said resistance element non-responsive to said physical quantity is connected in parallel with another secondary winding of said second transformer.

5. An electrical measuring instrument according to claim 3 wherein said resistance element responsive to said physical quantity is connected in parallel with a primary winding of said second transformer, and wherein said resistance element non-responsive to said physical quantity is connected in parallel with another primary winding of said second transformer.

6. An electrical measuring instrument comprising a bridge circuit having its ratio arms constituted by the secondaries of a transformer; one of its measuring arms constituted by a plurality of non-inductively wound resistances each responsive to a physical quantity to be measured and the other of its measuring arms constituted by a plurality of non-inductively wound resistances non-responsive to said physical quantity, each of said non-responsive resistances forming the counterpart of a corresponding responsive resistance, each resistance in each measuring arm being connected across a portion of the secondary of a second transformer connected to the source of energisation of the bridge.

7. A thermometer comprising a hollow sheath of corrosion resistant material having low thermal conductivity, first and second resistance elements mounted within said sheath, said first element comprising a second material responsive to temperature and non-inductively wound on a first support of said second material, said second element comprising a third material non-responsive to temperature and non-inductively wound on a second support of said third material, a common mounting for the corresponding ends of said first and second supports, said common mounting being of a high thermal conductivity and connected to one end of said sheath in a fluid-tight manner, a terminal block sealing the other end of said hollow sheath, said terminal block having electrical terminals thereon electrically connected to said first and second resistance elements, whereby said sheath may be submerged within a fluid the temperature of which is to be measured, and whereby a ratio instrument may be connected to said electrical terminals for measurement of the ratio of the resistances of said resistance elements, thereby determining the temperature of said fluid.

8. A thermometer according to claim 7, wherein said second material and said first support are of copper and wherein said third material and said second support are of an alloy having a low thermal coefficient of resistivity.

9. A thermometer according to claim 7 wherein said second resistive element is mounted coaxially within said first support.

10. An electrical measuring instrument for measuring a physical quantity comprising a pair of resistance elements of materials having different coefficients of resistivity in response to the physical quantity to be measured, each element having a known value of resistance under standard conditions relative to the other; each element comprising a support made of the same material as the element; and a common rigid mounting for both supports.

11. An electrical temperature measuring instrument comprising a pair of resistance elements of materials having different thermal coefficients of resistivity, each element having a known value of resistance relative to the other at a standard temperature; each element comprising a support of the same material as the element; and a common rigid mounting for both supports having a high heat conductivity.

12. An electrical resistance thermometer assembly comprising a copper resistance element wound on a copper support; a standard resistance element wound on a second support, said standard resistance element and second support being of a the same material and of an alloy having a low thermal coefficient of resistivity; a relatively large section high conductivity copper block constituting a common mounting for the corresponding ends of said supports; and a low thermal conductivity sheath embracing said elements.

13. An electrical resistance thermometer according to claim 12 wherein said sheath is resistant to corrosion by a fluid whose temperature is to be measured, and is connected to said common mounting in a fluid-tight manner.

14. An electrical resistance thermometer according to claim 12 wherein said standard resistance element is mounted coaxially within the support for said copper element.

References Cited by the Examiner

UNITED STATES PATENTS

| | | | |
|---|---|---|---|
| 1,050,081 | 1/1913 | Pearson | 307—103 |
| 2,632,144 | 3/1953 | Borell et al. | 323—75 |
| 2,685,203 | 8/1954 | McEvoy et al. | 73—362 |
| 2,698,406 | 12/1954 | Arrott | 73—362 |

OTHER REFERENCES

Wireless World: June 1961, TK 5700 W45, pp. 329–330.

ISAAC LISANN, *Primary Examiner.*

ROBERT B. HULL, *Examiner.*